United States Patent [19]

Aitken

[11] Patent Number: 5,718,127
[45] Date of Patent: Feb. 17, 1998

[54] LIQUID VAPOR CONTACT APPARATUS

[75] Inventor: William H. Aitken, Essex, England

[73] Assignee: The BOC Group plc, Windlesham Surrey, England

[21] Appl. No.: 661,772

[22] Filed: Jun. 11, 1996

[30] Foreign Application Priority Data

Jun. 12, 1995 [GB] United Kingdom ............ 9511861

[51] Int. Cl.⁶ ............................................. F25J 3/00
[52] U.S. Cl. .............................. 62/643; 62/903; 196/100; 202/158; 261/112.2
[58] Field of Search ................. 62/643, 903; 202/158; 196/100; 261/112.2

[56] References Cited

U.S. PATENT DOCUMENTS

| | | | |
|---|---|---|---|
| 4,486,210 | 12/1984 | Gauthier | 62/903 |
| 4,599,097 | 7/1986 | Petit et al. | 62/903 |
| 4,606,745 | 8/1986 | Fujita | 62/903 |
| 4,950,430 | 8/1990 | Chen et al. | |
| 5,316,628 | 5/1994 | Collin et al. | |

FOREIGN PATENT DOCUMENTS

| | | |
|---|---|---|
| A-654 827 | 12/1937 | Germany. |
| A-22 33 763 | 3/1973 | Germany. |
| C-41 22 369 | 10/1992 | Germany. |

*Primary Examiner*—Ronald C. Capossela
*Attorney, Agent, or Firm*—David M. Rosenblum; Salvatore P. Pace

[57] ABSTRACT

A liquid-vapour contact apparatus has pairs of vertical outer walls disposed in the manner of the vertical faces of a cuboid. The apparatus includes a plurality of spaced, parallel, vertical plates. Between each pair of adjacent plates there is a packing comprising a vertical array of corrugated liquid-vapour contact elements of the type that are used in the assembly of structured packing, and having the apexes of the elements in fluid tight engagement with the respective plates. The corrugations in each element slope from top to bottom in a direction opposed to that in which the corrugations in contiguous elements slope. The two outermost walls form the walls of the apparatus. The other walls comprise alternate edge portions of plates and of spacer bars. Liquid is distributed appreciably evenly between the passages formed by adjacent vertical plates at the top of the apparatus and flows over the elements and effectively vertically downwards. Vapour is distributed appreciably evenly between the passages formed by adjacent vertical plates at the bottom of the apparatus and flows effectively vertically up through the elements making intimate contact with the vapour. The apparatus may according to the description be manufactured by vacuum brazing in the manner of a matrix heat exchanger.

5 Claims, 2 Drawing Sheets

1

LIQUID VAPOR CONTACT APPARATUS

BACKGROUND OF THE INVENTION

This invention relates to a liquid-vapour contact apparatus suitable for use in fractional distillation of a liquid mixture comprising two or more components.

Conventional distillation columns normally employ tubular vessels with either circular, or part circular, liquid-vapour contact trays or contain structured packing. Distillation devices with flat outer faces giving a device in the manner of the vertical faces of a cuboid were described in GB-A-783 186 and GB-A-2 184 366. The devices described in these specifications require for their operation that the internal liquid-vapour contact members be horizontal and have regions where liquid can accumulate, such as specially designed troughs in the case of the first mentioned, or downcomers in the case of the second. An essential feature of the second mentioned patent is liquid-vapour contact members in the form of narrow sieve trays with downcomers, which would be difficult to manufacture. If the device is fabricated in the manner of a vacuum brazed heat exchange these features add to the manufacturing difficulty.

U.S. Pat. No. 5,316,628 discloses a process for simultaneously exchanging material and for exchanging heat, material change being effected between a gas phase and at least one liquid phase by contact and passage in opposite directions of the gas phase and of the at least one liquid phase and heat exchange being effected between a compartment (I) and another compartment (II). In compartment (I) a plurality of spacer plates defining material exchange passages are arranged and the material exchange is effected by causing the at least one liquid phase to flow over a substantially vertical or inclined wall of a corrugated spacer plate having perforations and by causing at least a fraction of the gas phase to traverse simultaneously said perforations in a substantially ascending direction to contact said at least one liquid phase. The heat exchange is effected by circulating a heat exchange fluid in the compartment (II) which has a common wall with the compartment (I).

A disadvantage of such an arrangement is that the corrugated spacer plate can fail to provide adequate liquid mixing. The invention aims at providing an apparatus that ameliorates this problem.

SUMMARY OF THE INVENTION

According to the present invention there is provided a liquid-vapour contact apparatus having vertical outer walls disposed in the manner of the vertical outer walls of a cuboid, said apparatus including a plurality of spaced, parallel, vertical plates, there being between each pair of adjacent plates corrugated packing having chosen liquid and vapour flow characteristics, and wherein the outermost plates provide one pair of opposed, vertical, outer walls of the apparatus, and the other pair of such walls comprise alternate plate edge portions and vertical spacer members, characterised in that each packing comprises a vertical array of corrugated liquid-vapour contact elements arranged one above another, with the corrugations in each liquid-vapour contact element slanting from top to bottom in one direction towards one side of the packing and the corrugations in the or each liquid-vapour contact element contiguous thereto slanting from top to bottom in another direction towards the opposite side of the packing.

The liquid-vapour contact elements are essentially the same as structured packing elements. In one embodiment each vertical plate save the outermost ones can have a plurality of apertures formed therethrough to provide equalisation of pressure and composition.

By virtue of the construction of the liquid-vapour contact apparatus it may additionally be arranged to include an integral reboiler and condenser of standard brazed heat exchanger construction, so forming a single unified construction.

The apparatus according to the invention is particularly suited to construction in the manner of a vacuum brazed or plate-fin heat exchanger. Construction is therefore relatively simple. Where such construction is not appropriate the layers of spaced, parallel, vertical plates and mass transfer elements may be held together by mechanical compression.

The apparatus according to the invention is particularly suited to cryogenic rectification, such as air separation. It would also be suitable for use on board a ship where the disturbance effects of ship movement would be less than with conventional liquid-vapour contact devices.

BRIEF DESCRIPTION OF THE DRAWINGS

Liquid-vapour contact apparatus will now be described by way of example with reference to the accompanying drawings, in which.

DETAILED DESCRIPTION

Figure 1:
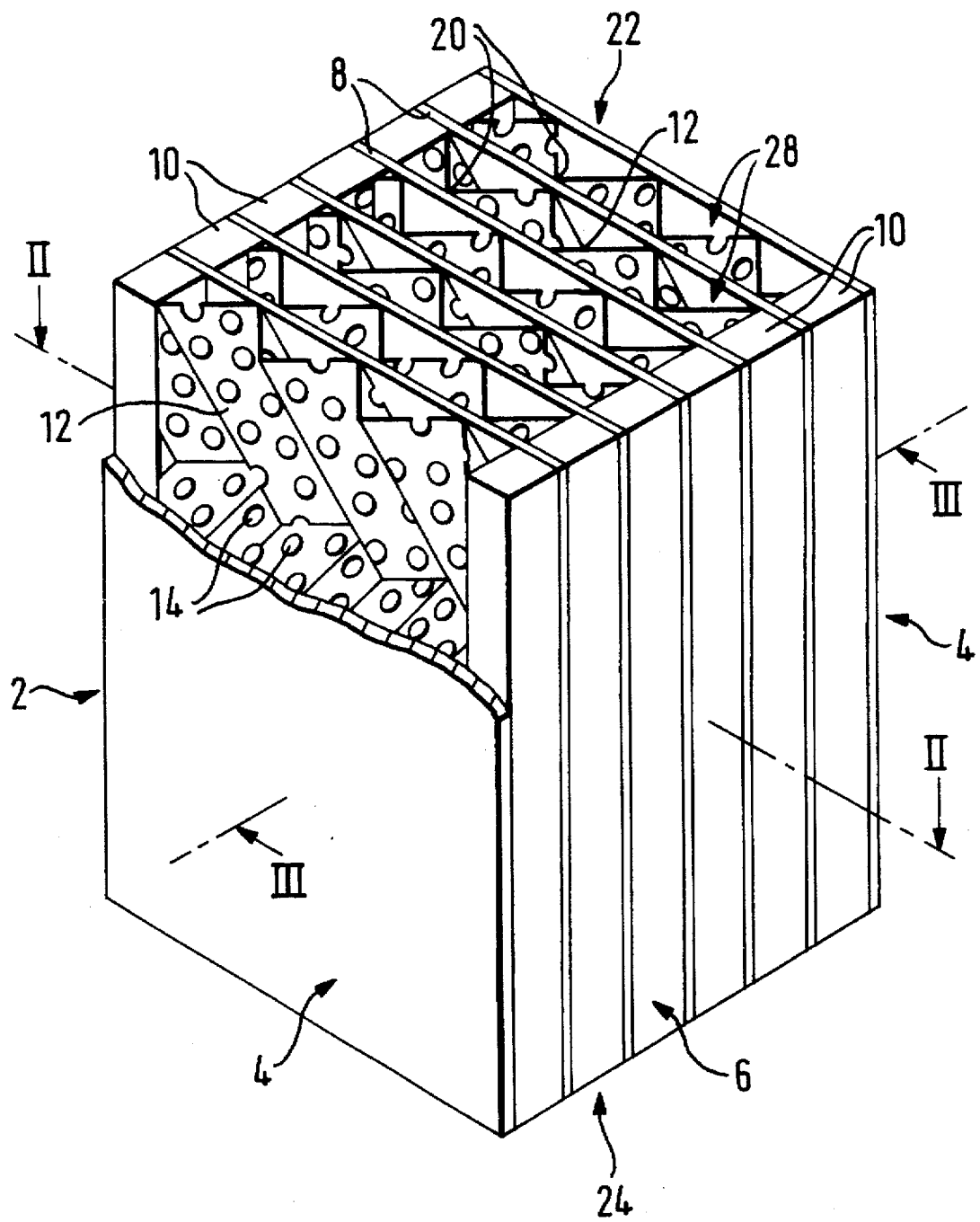
FIG. 1 is a schematic perspective view of the liquid-vapour contact device according to the invention.
Figure 2:
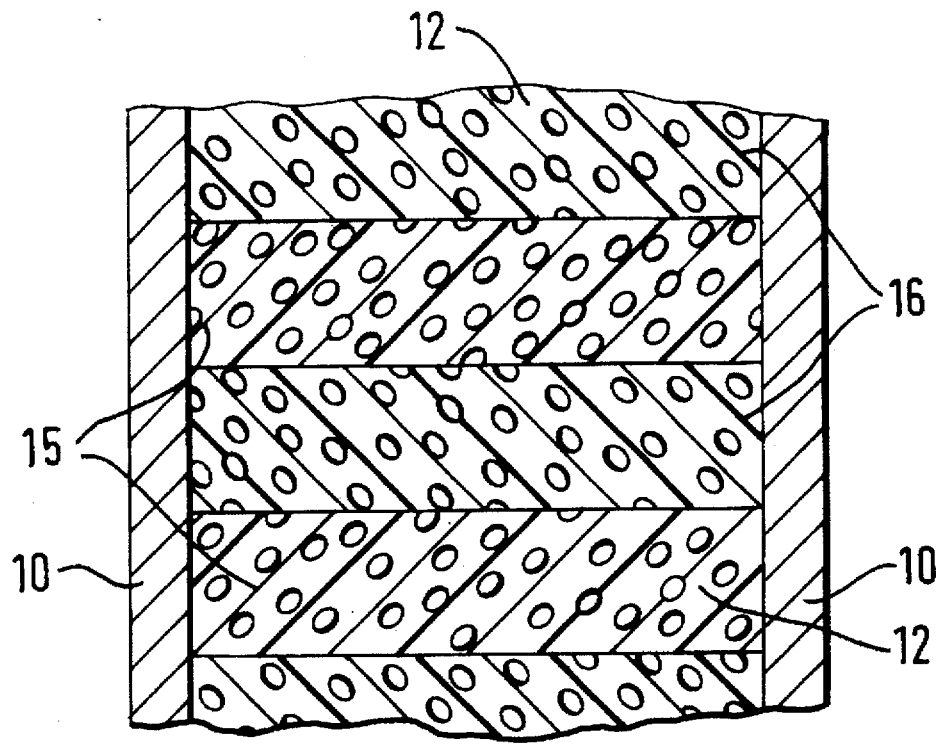
FIG. 2 is a section through the line II—II in FIG. 1.

Referring to the drawings, a liquid-vapour contact apparatus or distillation column 2 in accordance with the invention is shown. The distillation column 2 is generally cuboid in shape with a first pair of opposed, vertical outer walls 4 and a second pair of opposed vertical outer walls 6. As shown in FIGS. 1 and 2 the apparatus consists of a plurality of vertical plates 8 that are spaced equally apart from one another and extend in parallel with one another. The ends of the plates 8 are sealed by vertical spacing bars or members 10 extending from top to bottom of the apparatus 2. The two outermost ones of the plates 8 form the walls 4 of the apparatus 2. As shown in FIGS. 1 and 2 the walls 6 are formed from the edge portions of the vertical plates 8 and the vertical spacing bars or members 10.

Figure 3:
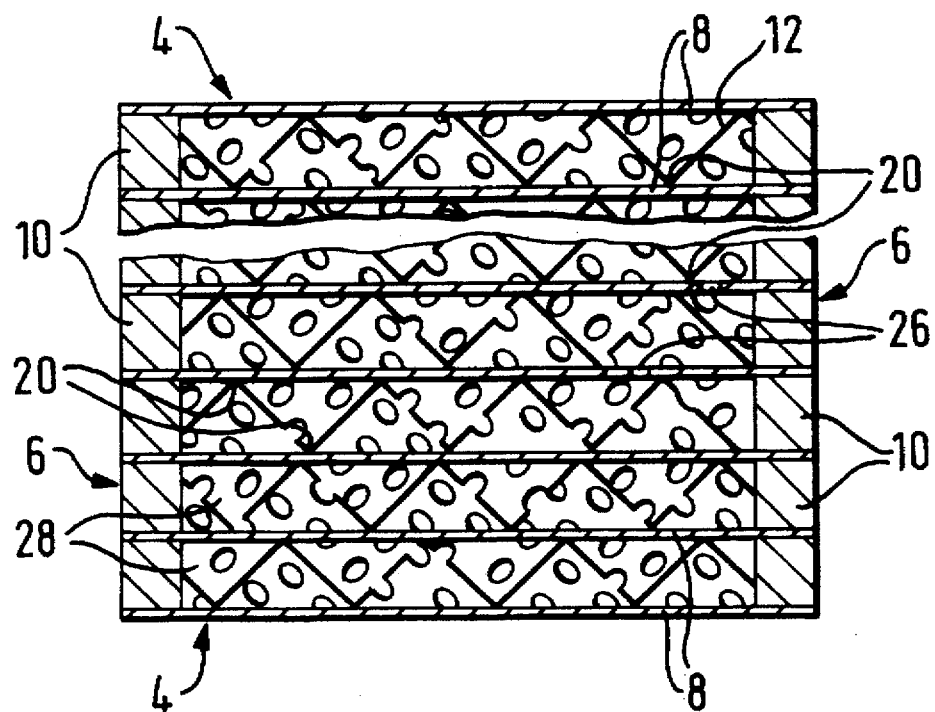
FIG. 3 is a section through the line III—III in FIG 1.

The apparatus 2 additionally includes a plurality of liquid-vapour contact elements 12, as shown in FIGS. 1, 2 and 3. Between each pair of adjacent plates 8 there is a vertical series of elements of the type used in structured packing, e.g. as shown in U.S. Pat. No. 4,296,050. The elements 12 shown are formed of corrugated plate material having perforations 14 in the plate. The direction of corrugations of the elements 14 are arranged at an angle to the horizontal. This angle is typically 45°. Between each pair of adjacent plates 8 the vertical elements are arranged alternately with the directions of the corrugations at in the opposite directions. FIG. 2 shows the elements first in one direction 16 and the adjacent or contiguous elements in the opposite direction 15. The apexes of the angles formed by the corrugations 20 are in fluid tight engagement with the plates 8 to which they abut.

Typically the apparatus 2 is formed of aluminum, although stainless steel, titanium and copper are acceptable alternatives. Typically in order to fabricate the apparatus 2 an assembly of all the plates 8, spacer bars or members 10 and liquid-vapour contact elements 12 (arranged alternately as shown 16 an 18) is made as shown in FIGS. 1 to 3. All of the abutting surfaces may then be vacuum brazed together to form a unitary apparatus. In general the method of manufacture may resemble that used to make matrix heat exchangers. If appropriate a condenser manufactured as a matrix heat exchanger may be made integrally with the described apparatus at the top of the unit 22 and a reboiler in a similar manner at the bottom 24.

It is not necessary that the apparatus 2 be formed of the metals described or the various abutting surfaces be vacuum brazed. Other metals may be used as well as non metals. Other methods of assembly of vertical plates 8, spacer bars 10 and liquid vapour contact elements 12 including mechanical compression may be employed.

In one version holes or orifices 26 may be incorporated in the vertical plates 8, except the outer two, to permit equalisation of pressure and vapour flow across the passages, as shown in FIG. 3.

In operation liquid is introduced to the top 22 of the apparatus and distributed evenly across each vertical passage 28 such that each passage has essentially the same flow rate of liquid. If the apparatus constitutes the top of a vapour-liquid contact column the liquid may be from a condenser, which in turn may or may not be integral with the apparatus 2. As the liquid flows along the liquid-vapour contact members and down the elements 16 and 18 of the apparatus 2 it comes into intimate mass transfer contact with vapour ascending the column. The vapour enters at the bottom 24 of the apparatus 22. The vapour must be evenly distributed across each vertical passage 28 such that each passages has essentially the same flow rate of vapour. The apparatus may form part of a total system and the vapour may be from another part of the system, which may be a similar type of apparatus, or another type of liquid-vapour contact apparatus or be fed from a pipe to the bottom 24 or be from a reboiler, which may or may not be integral with the apparatus 2. Thus the liquid as it descends the apparatus 2 tends to become richer in the less volatile component or components of the mixture being separated, and the vapour as it ascends the apparatus becomes richer in the more volatile component or components of the mixture being separated.

I claim:

1. A liquid-vapour contact apparatus including:
    vertical outer walls disposed in the manner of the vertical outer walls of a cuboid;
    a plurality of spaced, parallel, vertical plates; and
    corrugated packings located between pairs of said vertical adjacent plates and having chosen liquid and vapour flow characteristics;
    the outermost of said vertical adjacent plates providing one pair of opposed, vertical, outer walls of the apparatus, and the other pair of such walls comprise alternate plate edge portions and vertical spacer members;
    each of said corrugated packings comprising a vertical array of corrugated liquid-vapour contact elements arranged one above another, with the corrugations in each liquid-vapour contact element slanting from top to bottom in one direction towards one side of the corrugated packing and the corrugations in the or each of such liquid-vapour contact element contiguous thereto slanting from top to bottom in another direction towards the opposite side of the corrugated packing.

2. The liquid-vapour contact apparatus as claimed in claim 1, in which the angle of slant of each corrugation is 45° to the horizontal.

3. The liquid-vapour contact apparatus as claimed in claim 1 or claim 2, wherein each plate, save the outermost ones has a plurality of apertures formed therethrough for the passage of vapour.

4. A unitary apparatus additionally including:
    a reboiler;
    a condenser; and
    a liquid-vapour contact apparatus including:
        vertical outer walls disposed in the manner of the vertical outer walls of a cuboid;
        a plurality of spaced, parallel, vertical plates; and
        corrugated packings located between pairs of said vertical adjacent plates; and
        the outermost of said vertical adjacent plates providing one pair of opposed, vertical, outer walls of the apparatus, and the other pair of such walls comprise alternate plate edge portions and vertical spacer members;
        each of said corrugated packings comprising a vertical array of corrugated liquid-vapour contact elements arranged one above another, with the corrugations in each liquid-vapour contact element slanting from top to bottom in one direction towards one side of the corrugated packing and the corrugations in the or each of such liquid-vapour contact element contiguous thereto slanting from top to bottom in another direction towards the opposite side of the corrugated packing.

5. The unitary apparatus of claim 4, in which the liquid-vapour contact apparatus as claimed in claim 1, in which the angle of slant of each corrugation is 45° to the horizontal.

* * * * *